(12) United States Patent
Teng et al.

(10) Patent No.: US 9,967,834 B2
(45) Date of Patent: May 8, 2018

(54) METHODS AND APPARATUS FOR CONTROL MESSAGES IN OVERLAPPING CELLS

(71) Applicant: Nokia Solutions and Networks Oy, Espoo (FI)

(72) Inventors: Yong Teng, Beijing (CN); Kari Veikko Horneman, Oulu (FI); Bin Chen, Shanghai (CN); Jiang Wang, Shanghai (CN); Jing Xu, Shanghai (CN); Dario Serafino Tonesi, Wroclaw (PL)

(73) Assignee: Nokia Solutions and Networks Oy, Espoo (FI)

( * ) Notice: Subject to any disclaimer, the term of this patent is extended or adjusted under 35 U.S.C. 154(b) by 0 days. days.

(21) Appl. No.: 14/758,583

(22) PCT Filed: Jan. 15, 2013

(86) PCT No.: PCT/CN2013/070496
§ 371 (c)(1),
(2) Date: Jun. 30, 2015

(87) PCT Pub. No.: WO2014/110722
PCT Pub. Date: Jul. 24, 2014

(65) Prior Publication Data
US 2015/0358923 A1 Dec. 10, 2015

(51) Int. Cl.
*H04W 52/28* (2009.01)
*H04W 52/24* (2009.01)
(Continued)

(52) U.S. Cl.
CPC ....... *H04W 52/28* (2013.01); *H04W 52/0254* (2013.01); *H04W 52/243* (2013.01);
(Continued)

(58) Field of Classification Search
CPC ... H04W 84/045; H04W 16/32; H04W 48/12; H04W 88/08; H04L 5/006
See application file for complete search history.

(56) References Cited

U.S. PATENT DOCUMENTS 5,483,664 A * 1/1996 Moritz ............... H04B 7/18541
455/12.1
5,678,184 A * 10/1997 Cutler, Jr. .......... H04B 7/18541
455/13.1
(Continued)

FOREIGN PATENT DOCUMENTS

CN 1859726 A 11/2006
CN 102006599 A 4/2011
(Continued)

OTHER PUBLICATIONS

3GPP TR 36.839 V2.0.0 (Aug. 2012); 3rd Generation Partnership Project; Technical Specification Group Radio Access Network; Evolved Universal Terrestrial Radio Access (E-UTRA); Mobility Enhancements in Heterogeneous Networks (Release 11).
(Continued)

*Primary Examiner* — Bobbak Safaipour
(74) *Attorney, Agent, or Firm* — Harrington & Smith

(57) ABSTRACT

A method receiving a control message at an apparatus of a base station of a first smaller cell, said control message being provided by a control apparatus of a second larger cell, said first cell at least partially overlying said second cell, said control message being provided dependent on a speed of at least one user equipment; and causing, in response to said control message, said base station of said first cell to be in a first power and/or interference mode.

20 Claims, 8 Drawing Sheets

(51) Int. Cl.
  *H04W 72/04* (2009.01)
  *H04W 52/02* (2009.01)
  *H04W 88/08* (2009.01)
  *H04W 16/32* (2009.01)
  *H04W 36/32* (2009.01)
  *H04W 64/00* (2009.01)

(52) U.S. Cl.
  CPC ..... *H04W 52/244* (2013.01); *H04W 72/0406* (2013.01); *H04W 16/32* (2013.01); *H04W 36/32* (2013.01); *H04W 64/006* (2013.01); *H04W 88/08* (2013.01); *Y02B 60/50* (2013.01)

(56) References Cited

U.S. PATENT DOCUMENTS

| | | | | |
|---|---|---|---|---|
| 6,996,400 | B2* | 2/2006 | Posti | H04L 1/0002 455/441 |
| 9,351,216 | B2* | 5/2016 | Wu | H04W 36/22 |
| 9,622,272 | B2* | 4/2017 | Choi | H04W 76/02 |
| 2005/0059437 | A1* | 3/2005 | Son | H04W 52/0245 455/574 |
| 2008/0161013 | A1* | 7/2008 | Friman | H04W 48/14 455/456.1 |
| 2010/0254344 | A1 | 10/2010 | Wei et al. | |
| 2012/0214495 | A1* | 8/2012 | Choi | H04W 36/0055 455/444 |
| 2013/0143542 | A1* | 6/2013 | Kovvali | H04W 48/18 455/418 |
| 2013/0273906 | A1* | 10/2013 | Cucala Garcia | H04W 52/0274 455/426.1 |
| 2014/0071902 | A1* | 3/2014 | Sorrentino | H04W 52/325 370/329 |
| 2014/0185476 | A1* | 7/2014 | Gomadam | H04B 7/024 370/252 |
| 2015/0049681 | A1* | 2/2015 | Huang | H04W 72/1289 370/329 |
| 2015/0245270 | A1* | 8/2015 | Wu | H04W 36/22 370/331 |

FOREIGN PATENT DOCUMENTS

| | | |
|---|---|---|
| CN | 102300274 A | 12/2011 |
| CN | 102711252 A | 10/2012 |
| EP | 2056628 A1 | 5/2009 |

OTHER PUBLICATIONS

R2-121624; Nokia Siemens Networks, Nokia Corporation; "Improved Mobility State Estimation"; 3GPP TSG-RAN WG2 Meeting #77bis; Jeju, South Korea, Mar. 26-30, 2012.

3GPP TS 36.300 V11.3.0 (Sep. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).

M. Gruber, et al.; "Earth—Energy Aware Radio and Network Technologies"; 2009 IEEE; pp. 1-5.

Imran Ashraf, et al.; "Sleep Mode Techniques for Small Cell Deployments"; IEEE Communications Magazine, vol. 49, No. 8, pp. 72-79, Aug. 2011.

Imran Ashraf, et al.; "Improving Energy Efficiency of Femtocell Base Stations via User Activity Detection"; in the WCNC 2010 proceedings, pp. 1-5, Apr. 2010 (IEEE).

3GPP TR 36.921 V11.0.0 (Sep. 2012); 3rd Generation Partnership Project; Technical Specification Group Radio Access Network; Evolved Universal Terrestrial Radio Access (E-UTRA); FDD Home eNode B (HeNB) Radio Frequency (RF) requirements analysis (Release 11).

R2-122568; NTT Docomo, Inc.; "Summary of email discussion [77bis#31] LTE/Hetnet Mobility: Inter-frequency Hetnet"; 3GPP TSG-RAN WG2 #78; May 21-25, 2012; Prague, Czech Republic.

3GPP TS 36.304 V11.1.0 (Sep. 2012); 3rd Generation Partnership Project; Technical Specification Group Radio Access Network; Evolved Universal Terrestrial Radio Access (E-UTRA); User Equipment (UE) procedures in idle mode (Release 11).

3GPP TS 36.331 V11.1.0 (Sep. 2012); 3rd Generation Partnership Project; Technical Specification Group Radio Access Network; Evolved Universal Terrestrial Radio Access (E-UTRA); Radio Resource Control (RRC); Protocol specification (Release 11).

R2-121620; Nokia Siemens Networks, Nokia Corporation; "UE MSE based inter-frequency measurements"; 3GPP TSG-RAN WG2 Meeting #77bis; Jeju, South Korea, Mar. 26-30, 2012.

Motorola Mobility "*Mobility State Estimation Enhancements*" 3GPP Draft; R2-122712-UE Based Mobility State Estimation Enhancements, 3$^{rd}$ Generation Partnership Project (3GPP), Mobile Competence Centre; 650, Route Des Lucioles; F-06921 Sophia-Antipolis Cedex; France, vol. RAN WG2, no. Prague, Czech Republic; May 25, 2012, May 15, 2012, XP050607371.

* cited by examiner

METHODS AND APPARATUS FOR CONTROL MESSAGES IN OVERLAPPING CELLS

This disclosure relates to methods and apparatus and in particular but not exclusively to methods and apparatus for use where there are moving user equipment.

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a device such as a user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or another user equipment. The two directions of communications between a base station and communication devices of users have been conventionally referred to as downlink and uplink. Downlink (DL) can be understood as the direction from the base station to the communication device and uplink (UL) the direction from the communication device to the base station.

Some systems may have a number of small cells overlying larger or macro cells. The small cells may share the same carrier with the macro cell or use different carriers.

According to an aspect, there is provided a method comprising: receiving a control message at an apparatus of a base station of a first smaller cell, said control message being provided by a control apparatus of a second larger cell, said first cell at least partially overlying said second cell, said control message being provided dependent on a speed of at least one user equipment; and causing, in response to said control message, said base station of said first cell to be in a first power and/or interference mode.

The method may comprise receiving a release message from said control apparatus at said apparatus of said base station of said first cell, and in response to said release message permitting said base station of said first cell to be released from said respective first power and/or interference mode.

The control message may be configured to cause a timer in said base station of said first cell to be restarted.

The method may comprise causing said first base station to be capable of entering a second power and/or interference mode in response to an expiry of said timer.

The first base station may be configured to enter a second power and/or interference mode only if another user equipment requires said first base station to be in said second power and/or interference mode.

According to another aspect, there is provided a method comprising: causing a control message to be sent to a base station of a first smaller cell, said control message being caused to be sent by a control apparatus of a second larger cell, said first cell at least partially overlying said second cell, said control message being provided dependent on a speed of at least one user equipment and configured to cause said base station of said first cell to be in a first power and/or interference mode.

The comprising causing a release message to be sent from said control apparatus to said first base station of said first cell, said message being configured to release said first base station of said first cell from said respective first power and/or interference mode.

Various features may be used in embodiments associated with either of the two previous aspects.

The release message may be in response to said at least one user equipment moving out of a vicinity of said first cell.

The control message may be responsive to said at least one user equipment moving at a speed higher than or equal to a threshold.

The control message may be responsive to said at least one user equipment moving at a speed lower than or equal to a threshold.

The control message may be responsive to a threshold number of user equipment moving.

The control message may be responsive to a ratio of number of user equipment moving above a threshold speed to a number of user equipment moving at a speed lower than said threshold and/or stationary.

The control message may define an action to be performed by said first base station of said first cell.

The control message may provide information to said first base station of said first cell about movement of at least one user equipment.

The first power and/or interference mode may be a lower power and/or lower interference mode.

The first power and/or interference mode may be a higher power and/or interference mode.

In a lower interference mode said first base station of said first cell may be configured such that no discovery signal is transmitted.

In said first power mode said first base station of said first cell may be configured to remain in a lower power mode.

The control message may cause said first base station to be retained in said first power and/or interference mode.

The control message may cause said first base station of said first cell when in said first power mode to delay going to a second power mode.

The first power mode may comprise a sleep mode.

The apparatus may be provided in a second base station of a second cell.

The control apparatus may comprise or be provided in at least one of a base station and a network control element.

A computer program comprising program code means adapted to perform the method may also be provided. The computer program may be stored and/or otherwise embodied by means of a carrier medium.

According to another aspect, there is provided an apparatus comprising: means for receiving a control message, said control message being provided by a control apparatus of a second larger cell, said apparatus being of a base station of a first smaller cell, said first cell at least partially overlying said second cell, said control message being provided dependent on a speed of at least one user equipment; and means for causing, in response to said control message, said base station of said first cell to be in a first power and/or interference mode.

The receiving means may be for receiving a release message from said control apparatus at said apparatus of said base station of said first cell, said apparatus further comprising means for, in response to said release message, permitting said base station of said first cell to be released from said respective first power and/or interference mode.

The apparatus may comprise means for starting a timer in said base station of said first cell, in response to said control message.

The causing means may be for causing said first base station to be capable of entering a second power and/or interference mode in response to an expiry of said timer.

The causing means may be for causing said first base station to enter a second power and/or interference mode only if another user equipment requires said first base station to be in said second power and/or interference mode.

According to another aspect, there is provided control apparatus comprising: means causing a control message to be sent to a base station of a first smaller cell, said control apparatus being associated with a second larger cell, said first cell at least partially overlying said second cell, said control message being provided dependent on a speed of at least one user equipment and configured to cause said base station of said first cell to be in a first power and/or interference mode.

The causing means may be for causing a release message to be sent to said first base station of said first cell, said message being configured to release said first base station of said first cell from said respective first power and/or interference mode.

Various features may be used in embodiments associated with either of the two previous aspects.

The release message may be in response to said at least one user equipment moving out of a vicinity of said first cell.

The control message may be responsive to said at least one user equipment moving at a speed higher than or equal to a threshold.

The control message may be responsive to said at least one user equipment moving at a speed lower than or equal to a threshold.

The control message may be responsive to a threshold number of user equipment moving.

The control message may be responsive to a ratio of number of user equipment moving above a threshold speed to a number of user equipment moving at a speed lower than said threshold and/or stationary.

The control message may define an action to be performed by said first base station of said first cell.

The control message may provide information to said first base station of said first cell about movement of at least one user equipment.

The first power and/or interference mode may be a lower power and/or lower interference mode.

The first power and/or interference mode may be a higher power and/or interference mode.

In a lower interference mode, said first base station of said first cell may be configured such that no discovery signal is transmitted.

In the first power mode, said first base station of said first cell may be configured to remain in a lower power mode.

The control message may cause said first base station to be retained in said first power and/or interference mode.

The control message may cause said first base station of said first cell when in said first power mode to delay going to a second power mode.

The first power mode may comprise a sleep mode.

The apparatus may be provided in a second base station of a second cell.

The control apparatus may comprise or may be provided in at least one of a base station and a network control element.

According to another aspect, there is provided an apparatus comprising at least one processor and at least one memory comprising computer code for one or more programs, the computer code configured, with the at least one processor, to cause the apparatus at least to: receive a control message, said control message being provided by a control apparatus of a second larger cell, said apparatus being of a base station of a first smaller cell, said first cell at least partially overlying said second cell, said control message being provided dependent on a speed of at least one user equipment; and cause, in response to said control message, said base station of said first cell to be in a first power and/or interference mode.

The computer code configured with the at least one processor to cause the apparatus to receive a release message from said control apparatus at said apparatus of said base station of said first cell, and, in response to said release message, permit said base station of said first cell to be released from said respective first power and/or interference mode.

The computer code configured with the at least one processor to cause the apparatus to start a timer in said base station of said first cell, in response to said control message.

The computer code configured with the at least one processor to cause the apparatus to cause said first base station to be capable of entering a second power and/or interference mode in response to an expiry of said timer.

The computer code configured with the at least one processor to cause the apparatus to cause said first base station to enter a second power and/or interference mode only if another user equipment requires said first base station to be in said second power and/or interference mode.

According to another aspect, there is provided a control apparatus comprising at least one processor and at least one memory comprising computer code for one or more programs, the computer code configured, with the at least one processor, to cause the apparatus at least to: cause a control message to be sent to a base station of a first smaller cell, said control apparatus being associated with a second larger cell, said first cell at least partially overlying said second cell, said control message being provided dependent on a speed of at least one user equipment; and cause said base station of said first cell to be in a first power and/or interference mode.

The computer code configured with the at least one processor to cause the apparatus to cause a release message to be sent to said first base station of said first cell, said message being configured to release said first base station of said first cell from said respective first power and/or interference mode.

Various features may be used in embodiments associated with either of the two previous aspects.

The release message may be in response to said at least one user equipment moving out of a vicinity of said first cell.

The control message may be responsive to said at least one user equipment moving at a speed higher than or equal to a threshold.

The control message may be responsive to said at least one user equipment moving at a speed lower than or equal to a threshold.

The control message may be responsive to a threshold number of user equipment moving.

The control message may be responsive to a ratio of number of user equipment moving above a threshold speed to a number of user equipment moving at a speed lower than said threshold and/or stationary.

The control message may define an action to be performed by said first base station of said first cell.

The control message may provide information to said first base station of said first cell about movement of at least one user equipment.

The first power and/or interference mode may be a lower power and/or lower interference mode.

The first power and/or interference mode may be a higher power and/or interference mode.

In a lower interference mode, said first base station of said first cell may be configured such that no discovery signal is transmitted.

In the first power mode, said first base station of said first cell may be configured to remain in a lower power mode.

The control message may cause said first base station to be retained in said first power and/or interference mode.

The control message may cause said first base station of said first cell when in said first power mode to delay going to a second power mode.

The first power mode may comprise a sleep mode.

The apparatus may be provided in a second base station of a second cell.

The control apparatus may comprise or be provided in at least one of a base station and a network control element.

According to another aspect, there is provided a method comprising: receiving a control message at an apparatus of a base station of a first smaller cell, said control message being provided by a control apparatus of a second larger cell, said first cell at least partially overlying said second cell, said base station of said first smaller cell being in a less active mode, said control message being provided dependent on a speed of at least one user equipment being equal to or higher than a threshold; and causing, in response to said control message, said base station of said first cell to stay in said less active mode.

It should be appreciated that at least any one of the features discussed in relation to any of the previous aspects may be used in conjunction with this aspect.

According to another aspect, there is provided an apparatus comprising: means for receiving a control message at an apparatus of a base station of a first smaller cell, said control message being provided by a control apparatus of a second larger cell, said first cell at least partially overlying said second cell, said base station of said first smaller cell being in a less active mode, said control message being provided dependent on a speed of at least one user equipment being equal to or higher than a threshold; and means for causing, in response to said control message, said base station of said first cell to stay in said less active mode.

It should be appreciated that at least any one of the features discussed in relation to any of the previous aspects may be used in conjunction with this aspect.

It should be appreciated that any feature of any aspect may be combined with any other feature of any other aspect.

Embodiments will now be described in further detail, by way of example only, with reference to the following examples and accompanying drawings, in which.

Figure 4:
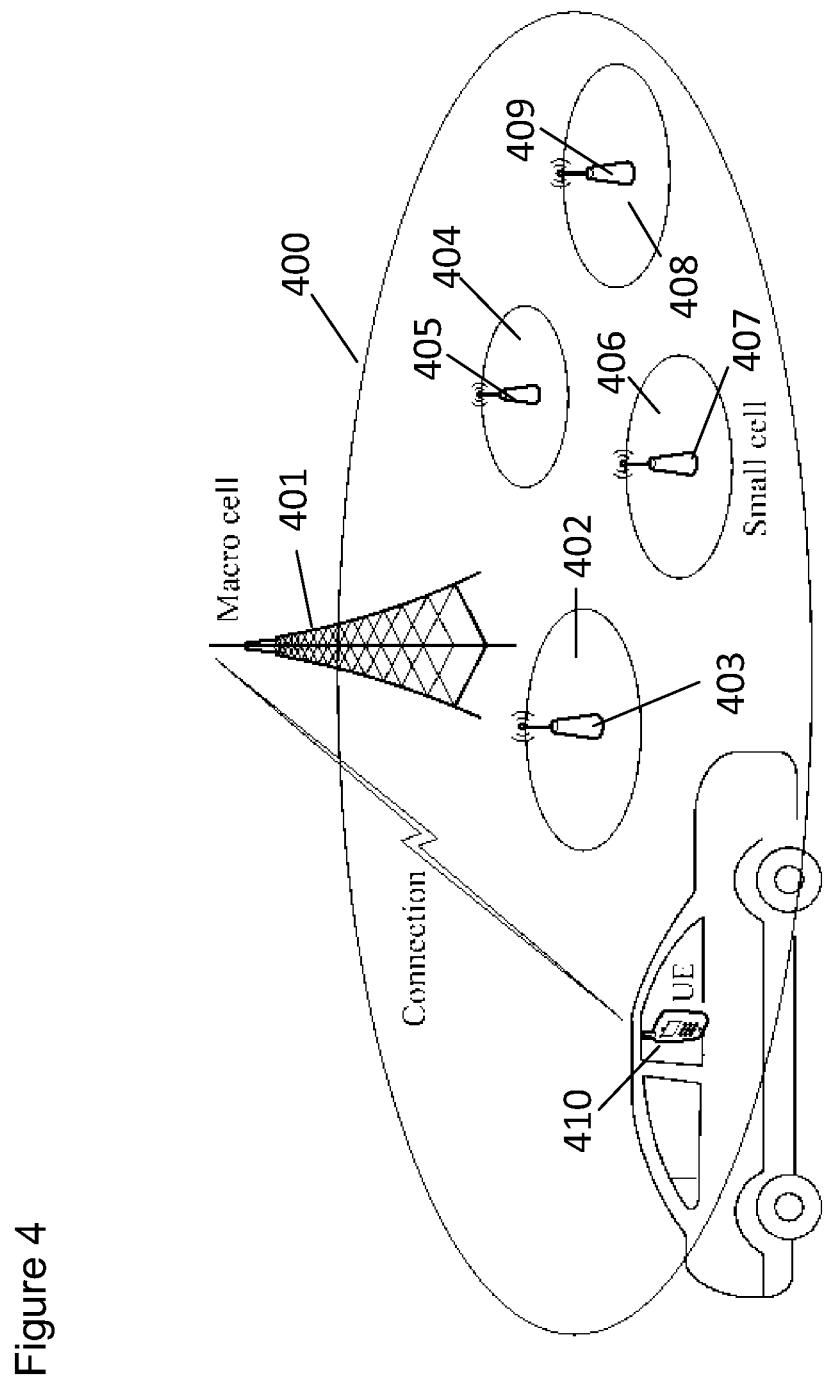
Figure 5:
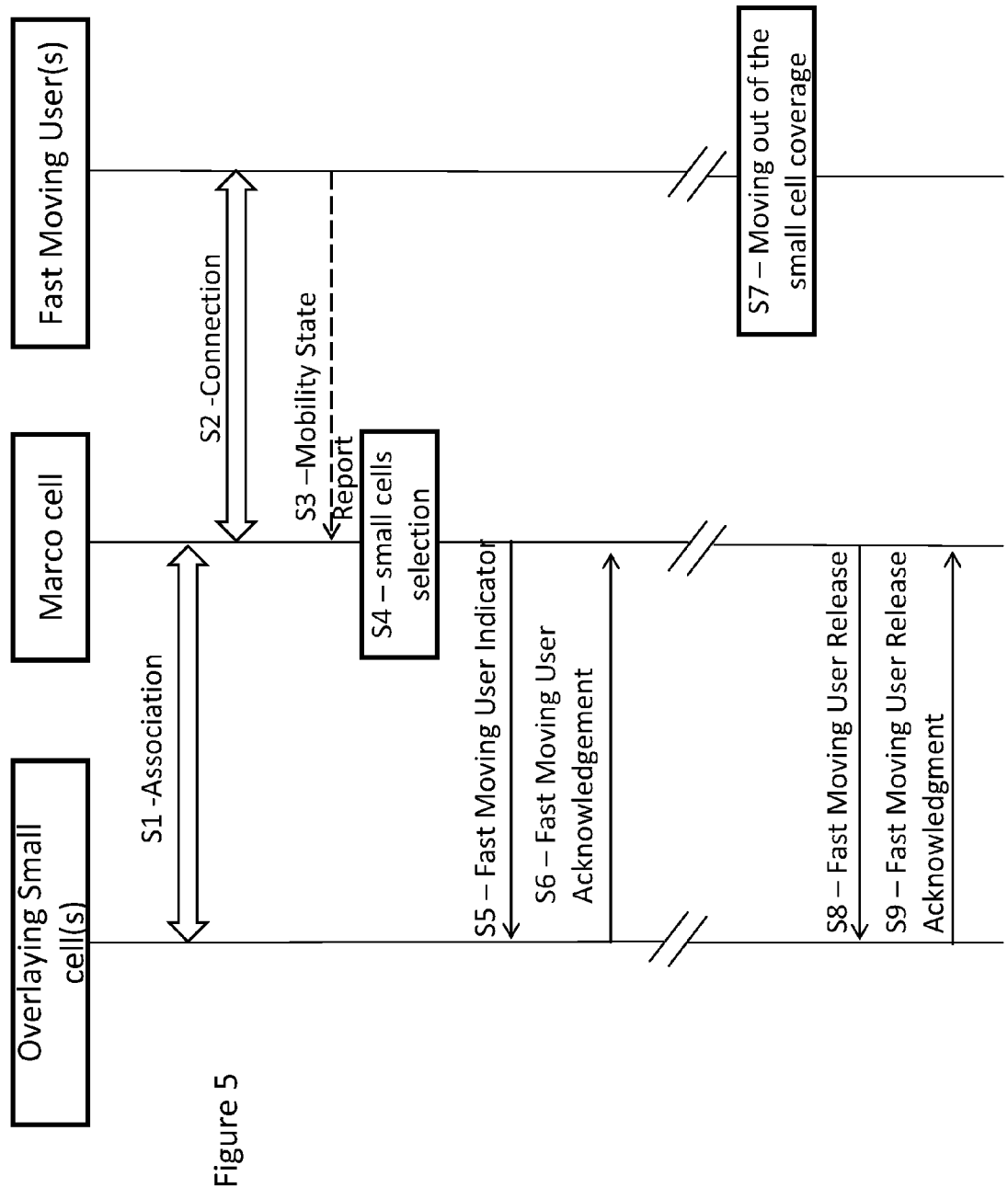
Figure 6:
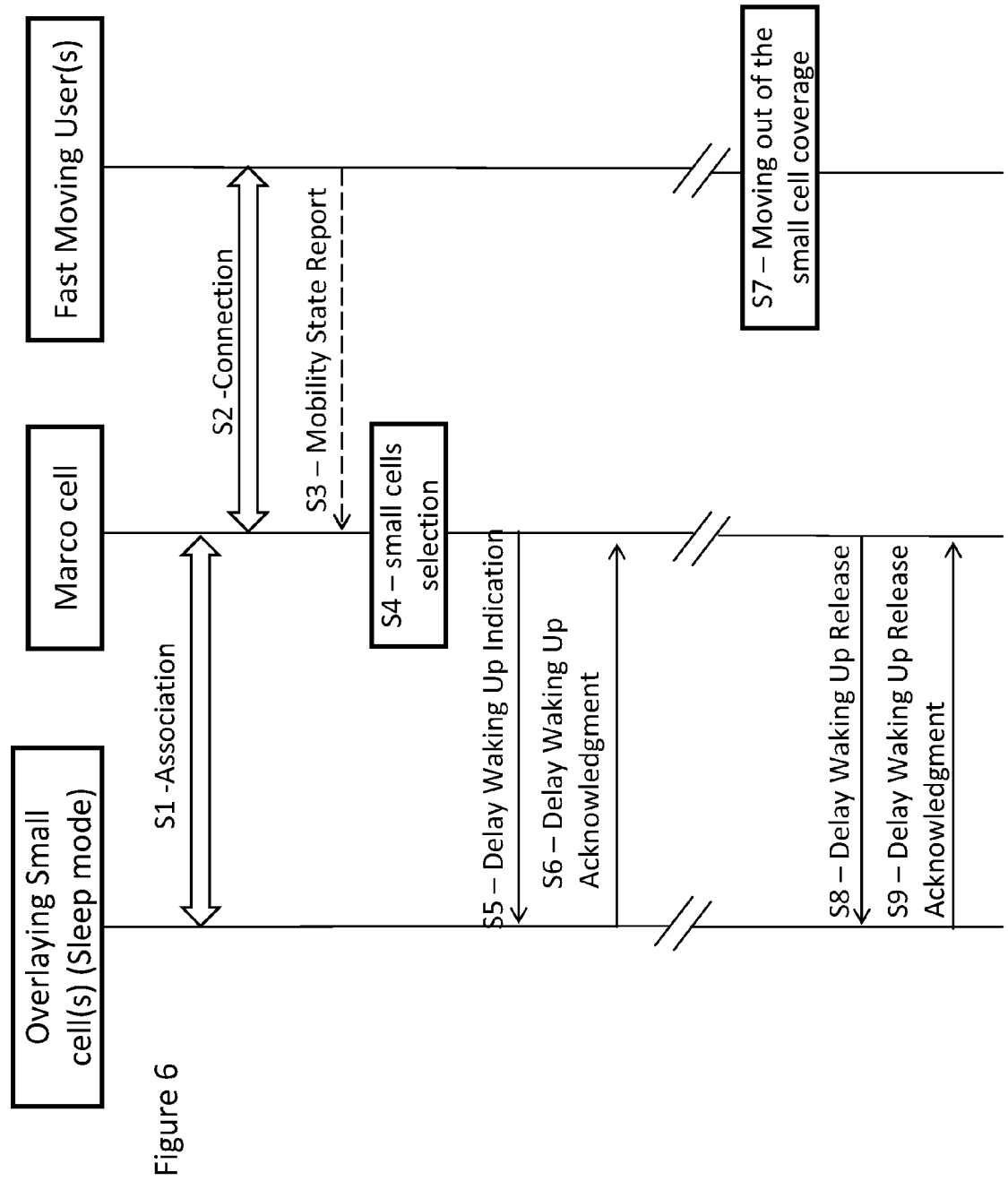
Figure 7:
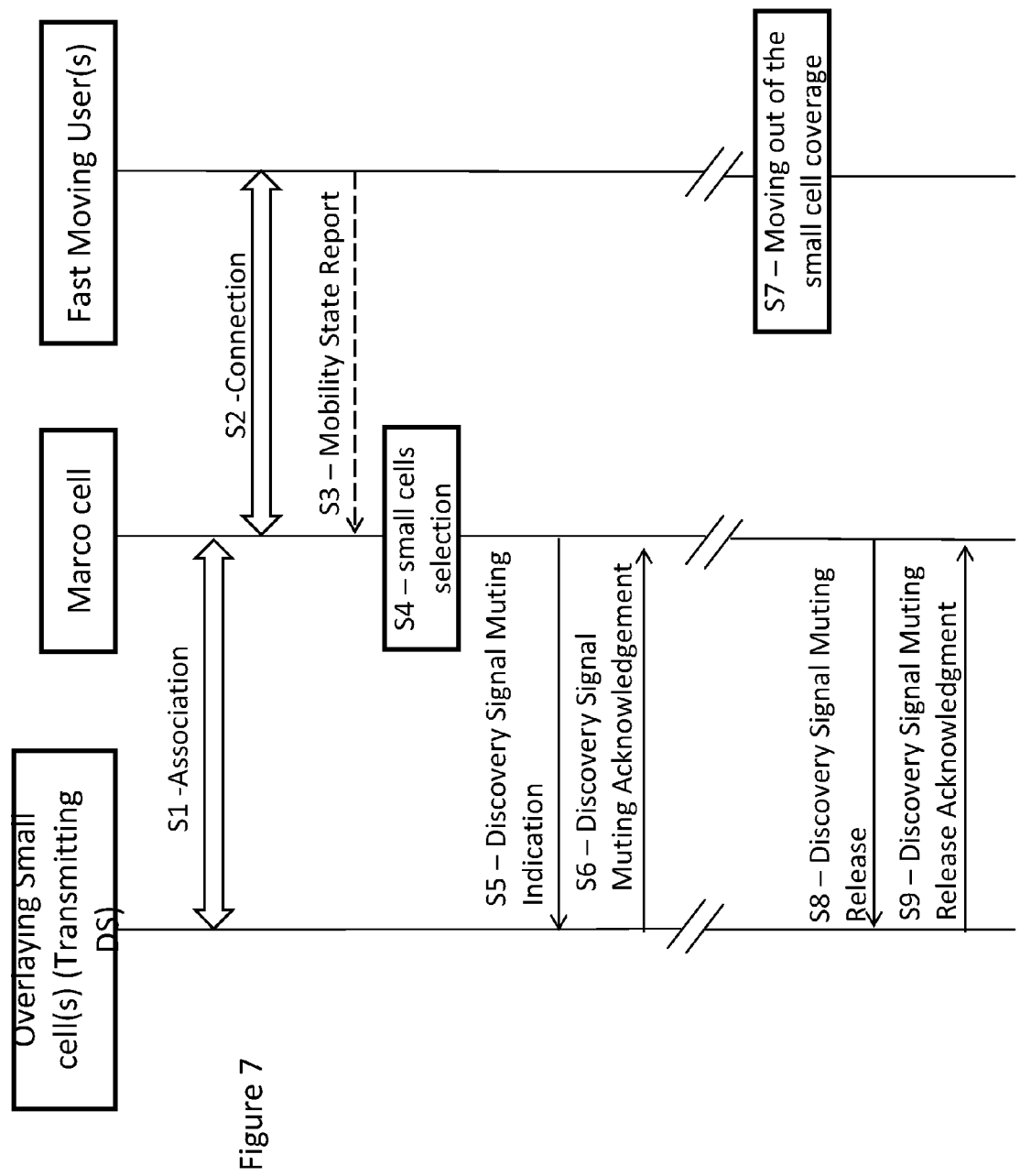
Figure 8:
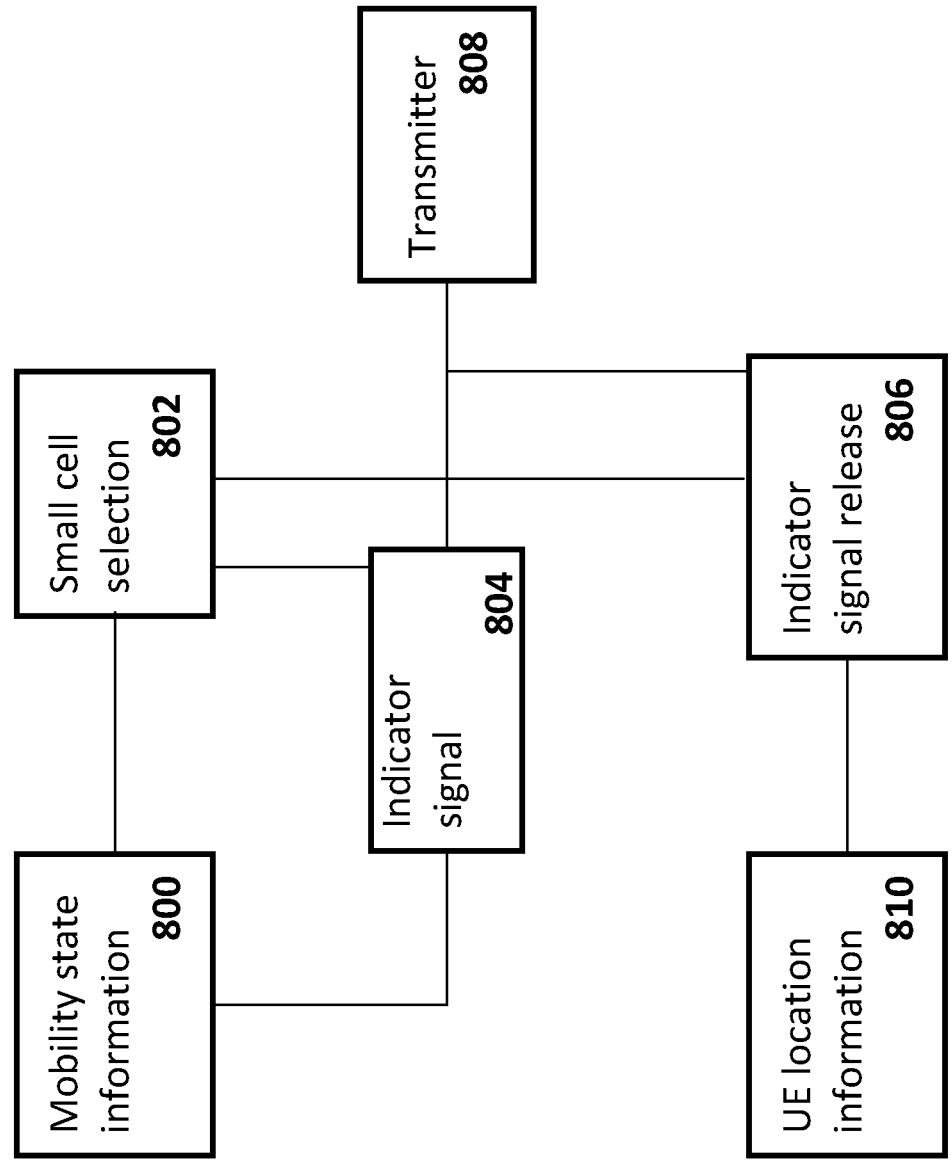

FIG. 4 schematically illustrates a high speed user equipment moving through a macro cell;

FIG. 5 shows a flow diagram of a first embodiment;

FIG. 6 shows a flow diagram of a second embodiment;

FIG. 7 shows a flow diagram of a further embodiment;

FIG. 8 schematically shows some parts of a base station of a macro cell; and

Figure 9:
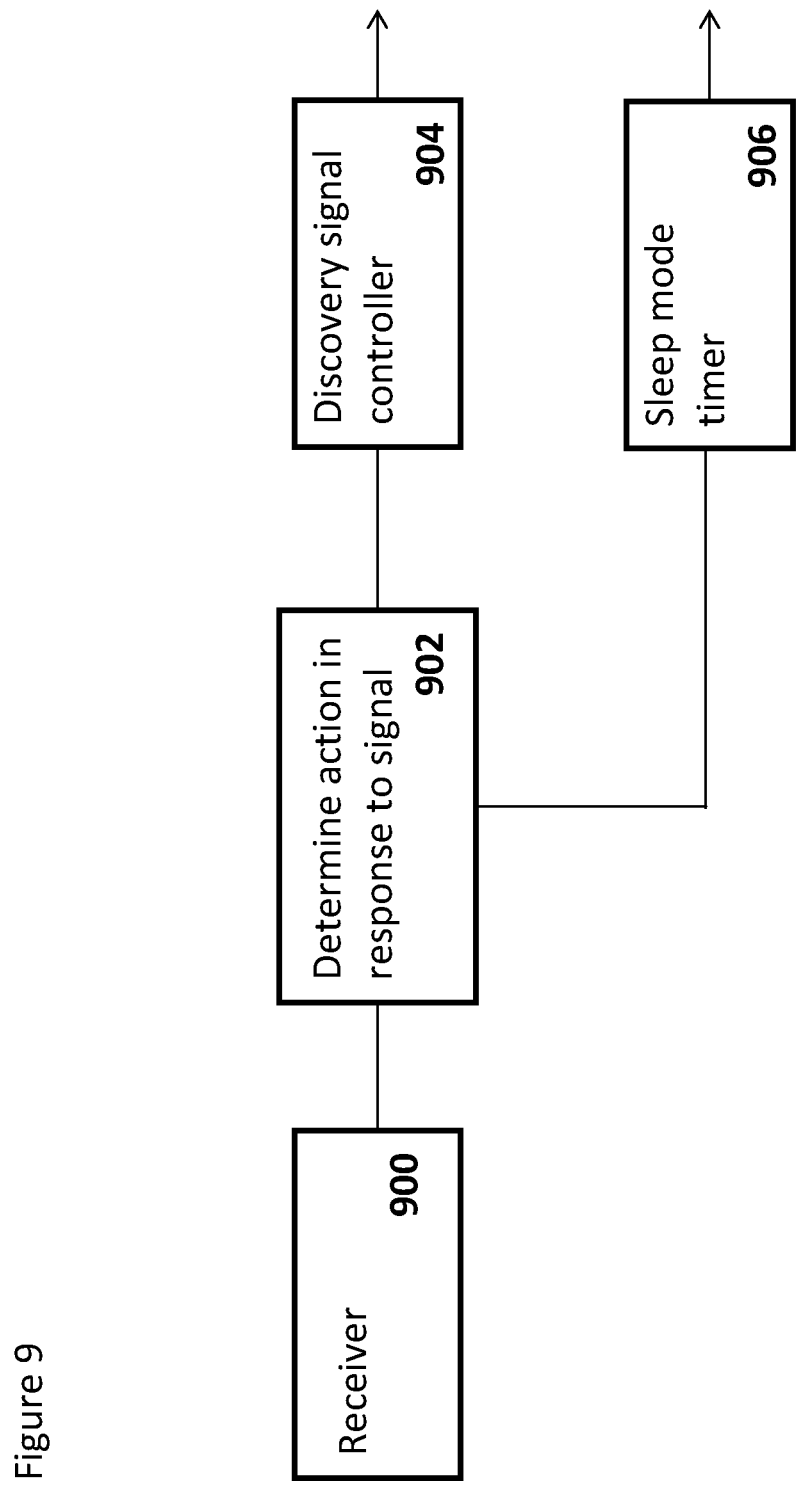

FIG. 9 shows some parts of a base station of a small cell

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1 an example of two overlapping access systems or radio service areas of a cellular system 100 and 110 and three smaller radio service areas 115, 117 and 119 provided by base stations 106, 107, 116, 118 and 120 are shown. Each mobile communication device and base station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell may be served by the same base station.

Figure 1:
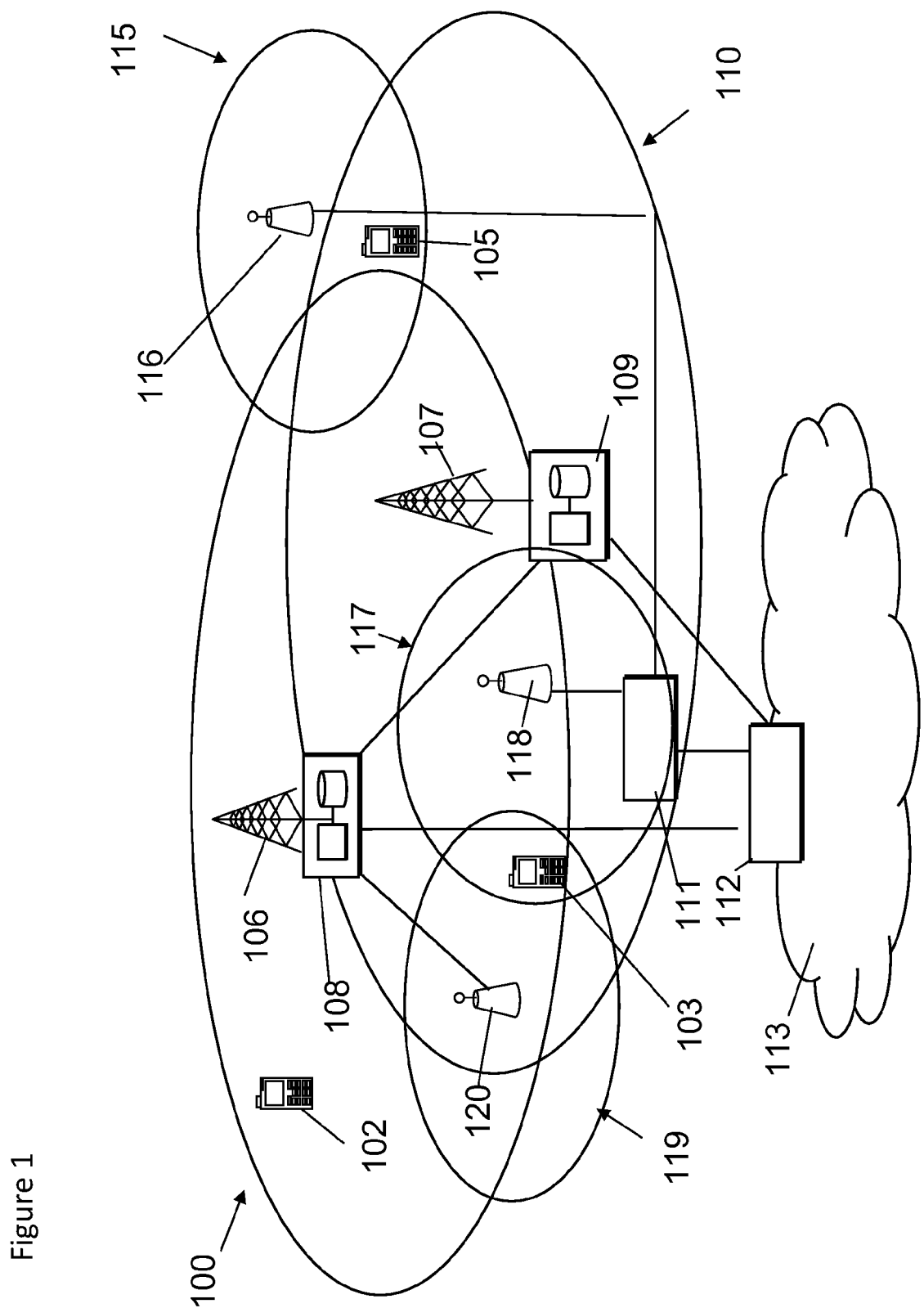
FIG. 1 shows a schematic diagram of a communication system comprising a base station and a plurality of communication devices.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided.

Figure 2:
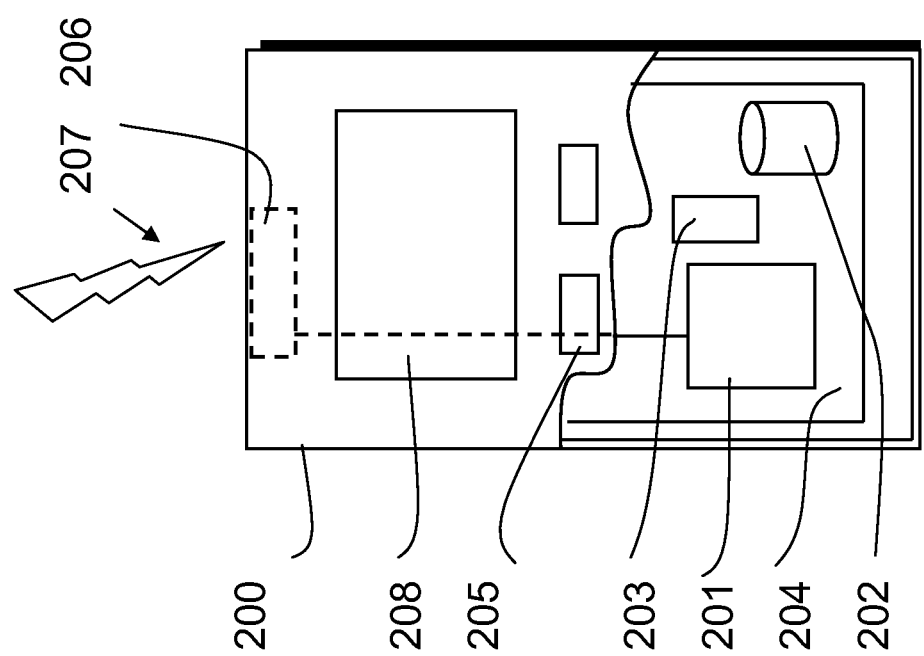
FIG. 2 shows a schematic diagram of a mobile communication device according to some embodiments.

A possible mobile communication device will now be described in more detail with reference to FIG. 2 showing a schematic, partially sectioned view of a communication device 102. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 102 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signaling and muting patterns can be associated with TX antenna numbers or port numbers of MIMO arrangements.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
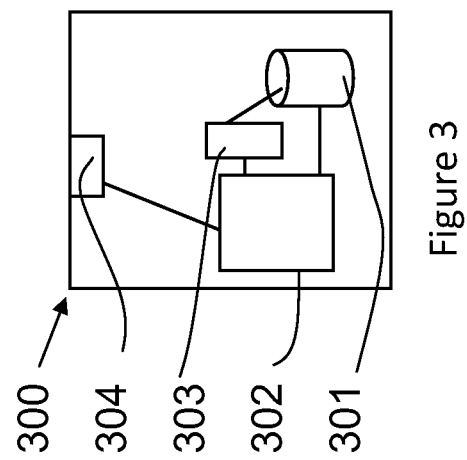
FIG. 3 shows a schematic diagram of a control apparatus according to some embodiments.

FIG. 3 shows an example of a control apparatus for a communication system, for example to be coupled to and/or for controlling a station of an access system, such as a base station. In some embodiments, base stations comprise a separate control apparatus. In other embodiments, the control apparatus can be another network element such as a radio network controller. In some embodiments, each base station may have such a control apparatus as well as a control apparatus being provided in a radio network controller. The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. For example the control apparatus 109 can be configured to execute an appropriate software code to provide the control functions.

The communication devices 102, 103, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Some embodiments may be used with LTE HetNet where a number of small cells are deployed with macro cells in an overlaid way. The small cells may share the same carrier with the macro cell, or use different carriers.

It has been suggested that mobility state estimation MSE of a UE be used to improve the performance of a HetNet system where there is movement of a UE. One option which has been considered is to update the MSE event count by different values that depend on the cell type. The eNB may for example carry out MSE or have MSE and thus will have information about the mobility of UEs.

In one HetNet scenario, there may a very large number of small nodes in a hotspot and/or indoor deployment. To improve the energy efficiency of small cells, one or more lower power and/or interference modes may be provided. By way of example only, a lower power mode may be achieved by one or more of reducing the number of signals transmitted, reducing the number of different frequencies used, changing the power with which signals are transmitted, switching off one or more components, putting one or more components into a lower power mode such as a standby mode and reducing the amount of time for which the base station is in an active mode. One example of a lower power mode may be a sleep or dormant mode. For example, dynamic sleep/active mode transitions for small cells may be an effective way for energy saving. A sleep mode or dormant mode for small cells could be reflected in a diverse number of ways. For instance, a small cell in sleep or dormant mode could turn off its transmission totally, or only transmit a discovery signal or a cell identification signal, or only transmit one or some reference signal, or transmit some signals infrequently etc. It should be appreciated that any of the described embodiments can be applied to any lower power or interference mode.

A dynamic sleep/active mode transition scheme based on user activity detection (for example of a user connected to a macro level base station) may be used with small cells. If an active UE is detected in the coverage area of a small cell, that small cell may switch from sleep to active mode and activate its pilot signal transmission. In one approach detection based on interference over thermal (IoT) may be used to detect uplink transmissions. In another approach detection of uplink reference signals (UL RS) may be used by the small cell for the detection of uplink transmissions.

One proposal for inter-frequency small cell discovery is that an inter-frequency small cell can transmit a discovery signal in macro frequency layer to facilitate small cell discovery for a UE which is in the macro cell without frequent inter-frequency measurement. This is where the macro cell and the small cell use different frequencies.

Some embodiments are used where a relatively fast moving user equipment passes through a HetNet environment where a number of small cells are deployed within the coverage of a macro cell, as shown in FIG. 4.

As shown in FIG. 4, a macro cell 400 is served by a macro base station 401. Overlying the macro cell 400 are, in this example, four small cells. The first small cell 402 is served by a base station 403. The second small cell 404 is served by a base station 405. Likewise the third small cell 406 is served by base station 407 and the fourth small cell 408 is served by base station 409. As can be seen, the four small cells are within the coverage area of the macro cell 400. One or more of the small cells 403, 405, 407 and 409 may be only partially in the coverage area of the macro cell 400, and may be also in the coverage area of another macro cell (not shown). A user equipment 410 is in a vehicle which travels through the macro cell 400 relatively fast. It should be appreciated that the number of small cells shown in FIG. 4 is by way of example only and in other embodiments fewer or more than four small cells may be provided which at least partially overlap the macro cell.

The time of stay within a small cell may be short if a fast moving user equipment is handed over to the small cell, and furthermore a short time of stay will incur more signaling overhead, which may result in a battery drain and/or drop in throughput. Thus it may be desirable to avoid handing over fast moving user equipment to a small cell, unless the small cell is deployed for a hole in the coverage area provided by the macro cell. Since handovers are network controlled in LTE, the serving macro cell may be arranged so that fast moving UEs are not handed over to a small cell if the serving macro cell is aware that the small cell is a small cell and the small cell is not for hole coverage purpose.

However there may be some problems from the perspective of the small cells. For energy saving, a small cell may wake up from the sleep mode only if active users appear in its coverage area. But if the active user is a fast moving UE, which will not be handed over to the small cell, the transition from sleep mode to active mode for the small cell is needless and will waste energy as well as cause interference to the fast moving user equipment.

There may be a discovery signal transmission scheme to facilitate small cell discovery for a UE. In the case of a fast moving UE which will not be handed over to the nearby small cell, the discovery signal from that small cell is needless and may cause interference if the discovery signal is transmitted on the frequency on which the UE is operating. Furthermore the measurement and reporting of the discovery signal by the UE is unnecessary for the fast moving UE.

In a macro only network, the current LTE specifications include UE MSE, which may be based on the number of past cell reselections (Idle mode) or handovers (Connected mode). For medium and high mobility states in the Idle mode, UE may add an offset to the signaled Qhyst (cell reselection margin) and scales the Treselection by a factor given by the mobility state to speed up the reselection. Treselection may control the cell reselection timer value. In the Connected mode, the UE may scale TTT (Time to Trigger) by a factor to expedite the handover process when UE is fast moving. These are examples of one or more mechanisms that may be used to optimize mobility for high velocity UEs in a homogenous (that is macro cell only) network. However these mechanisms may not always work well in HetNet environments. For example handing over high velocity UE to a small cell may not be desirable and should be avoided in some embodiments.

Since it may be better to steer a high mobility state UE away from small cells, a UE-mobility-state based small cell inter-frequency measurements is proposed. If a UE reaches a given mobility state estimation threshold, the inter-frequency measurement for small cells may be stopped. This option for steering away high mobility state UEs from small cells may be UE based.

However the optimization on the behavior of the small cells is currently not considered when the fast moving UE is approaching. The small cell may cause interference to the fast moving UE and may also be energy inefficient if the small cell is waken up from sleep mode to deal with the fast moving UE. In some denser small cell deployments, the number of UEs which are dealt with by a small cell may be relatively low and optimization from small cell perspective may be particularly advantageous.

In some embodiments, some enhancements on the small cell side are proposed in order to avoid or reduce high mobility state UE from small cells.

In some embodiments, a cooperation mechanism enabling energy efficiency and/or interference reduction may be provided for mobility management in an environment such as a HetNet environment. In some embodiments, the serving macro cell of one or several fast moving UEs may provide information about the fast moving UEs to the overlaying small cells and/or directly indicate to the overlaying small cells the action or actions which the small cells may take due to the appearance of the fast moving UEs. In some embodiments, the serving macro cell may provide information about one or more fast moving UEs and/or one or more slow moving UEs. The information may be for example the number of fast and/or slow moving UEs or the ratio of slow and fast moving UEs. The information may be provided to the overlaying small cells and/or directly indicate to the overlaying small cells the action or actions which the small cells should take due to moving speed of one or more UEs. Thus the triggering conditions may be just one fast moving UE, or a specific number of fast moving UEs, or the number of fast moving UEs with respect to the number of slow moving UEs, or any other trigger.

A first embodiment will now be described. In one embodiment, the serving macro cell sends a Fast Moving User Indicator to the selected small cells. The small cell autonomously decides the actions that the small cell may take based on the contents of the indicator. The actions may comprise one or more of delay in waking up although an active UE is detected and stopping the discovery signal transmission for some time.

FIG. 5 shows a flowchart of a proposed scheme for the first embodiment in which the macro cell indicates the fast moving user equipment to the overlaying small cells.

When a small cell is powered on or reset, the small cell will go through an initialization process in which the small cell can make association with one or more macro cells based on network listening. This is step S1.

In step S2, a fast moving user equipment is connected to the macro cell. This may be because the fast moving UE is handed over to the macro cell from a neighbour cell or the fast moving UE changes to the connected mode from the idle mode.

In step S3, when communicating with the serving macro cell, the UE can estimate its mobility state according to one or more rules. By way of example, the UE can count the number of past cell handovers (reselections) and optionally take the different cell types into account. Alternatively or additionally, the UE may use any method of MSE, such as for example discussed in 3GPP. After the UE has estimated its mobility state, the UE will report its mobility state to the serving macro cell. The mobility state may be defined as being normal, high or low. Alternatively a value may be associated with mobility. Alternatively or additionally, the serving macro base station may be aware of the mobility state of the connected UE based on some mechanisms which may or may not use the report from the UE. In some embodiments, this may mean that step S3 is not required. The macro base station may receive the indication about the mobility state of the UE from some other network element (not shown).

In step S4, the serving macro cell of a fast moving UE is aware that the UE is moving quickly in the macro coverage area. In this step the serving macro cell of the fast moving UE will select or determine one or more overlaid small cells which are probably or likely to be in the vicinity of the fast moving UE. The selection can be based on for example the location information of UE and the one or more small cells if available, and/or based on neighbour cell measurements report from the UE and the one or more small cells. It should be appreciated that other embodiments, may use any other method to determine if there or one or more small cells likely to be in the vicinity of the fast moving UE. Alternatively the serving macro cell may select all cells which at least partially overlay the macro cell.

In step S5, after selecting one or more small cells in the vicinity of the fast moving UE, the serving macro cell will send a Fast Moving User Indicator message to the selected small cells. The Fast Moving User Indicator may be used to tell the small cells that one or more fast moving UEs are approaching. Information identifying the fast moving UE may be included in the message. The one or more small cells receiving this message may utilize the UE specific information to identify the fast moving UE.

The Fast Moving User Indicator message may comprise information on one or more of the following parameters:
An indicator indicates that one or several specific UEs approaching the small cell are fast moving UEs;
The number of fast moving UEs
The estimated crossing time for fast moving UEs;
UE specific information, for example UE signature information, which may be used by the small cell to decode the signal from the fast moving UE if needed. The specific information may be for one or more UEs.

In step S6, on receiving the Fast Moving User Indicator message from the macro cell, the small cell may send a Fast Moving User Acknowledgement to the macro cell. Then the small cell may autonomously decide on one or more actions based on the contents of the indicator. These actions may comprise one or more of the following—if the small cell is in the sleep mode, delaying or prevent waking up in response to the detection by the small cell of the active macro UE being detected and stopping the small cell from transmitting a discovery signal for some time. Optionally the small cell may decode the signal from the fast moving UE using for example the UE signature information included in the Fast Moving User Indicator message and in this way the small cell may be aware of whether or not there are other active macro UEs in the vicinity of the small cell which are not fast moving. If there are other UEs in the vicinity of the small cell which are not fast moving the small cell may wake up and/or send a discovery cell transmission.

In step S7, the fast moving UE moves out of the small cell coverage area, or turns to Idle mode, or slows down (for example at or below a threshold speed defining the borderline when a user is a fast moving user).

In step S8, after the fast moving UE moves out of the coverage of the small cell, or turns to Idle mode, or slows down, the serving macro cell of the fast moving UE will send a Fast Moving User Release message to the one or more or all overlaying small cells which may (or may not) have received the Fast Moving User Indicator message previously. The Fast Moving User Release message may include the identity of the previous fast moving UE and other related information.

In step S9, on receiving the Fast Moving User Release message from the macro cell, the small cell will send a Fast Moving User Release Acknowledgement message to the macro cell as a response.

In some alternative embodiments, one or more messages may be sent to at least one small cell. These one or more messages may be considered to be a slow moving user indication. This indication may be sent from the macro cell to one or more small cells overlaying at least partly the macro cell. When the one or more small cell receive such an indication, the one or more cells may wake up and/or enable the transmission of the discovery signal, which may happen for a defined time only.

A second embodiment will now be described with reference to FIG. 6. In this embodiment, for one or more small cells in a sleep mode, the serving macro cell of the fast moving UE may send a Delay Waking Up Indication to the one or more selected small cells in sleep mode. In one embodiment, only if the measured IoT value at the small cell exceeds or equals a predetermined threshold for a defined time, which is longer than the time specified in the Delay Waking Up Indication, the small cell may wake up. The threshold may depend on the number of users which may be offloaded from the macro cell to small cell. One macro user may cause a certain rise on the interference level of a small cell depending on the user activity and traffic type. Based on this one or more of these types of information it is possible to predict how many users there are active inside the coverage of small cell.

A Delay-waking-up timer may be maintained at the small cell. The small cell may (re)start the Delay-waking-up timer each time it receives the Delay Waking Up Indication message and may remain in sleep mode until the timer expires. IoT is one option for measuring user activity. Alternatively or additionally it is possible for a small base station also to listen to the uplink signaling of macro users to determine user activity The flow of FIG. 6 will now be described in more detail.

Steps 1 to 3 are the same as those described in relation to FIG. 5.

In step S4, the serving macro cell of a fast moving UE is aware that this UE is moving quickly in its coverage area. The serving macro cell of the fast moving UE may select one or more small cells which are in a sleep mode and which are probably in the vicinity of the fast moving UE. The selection may be based on any of the methods discussed in relation to FIG. 5. Alternatively all overlaying, or at least partly overlaying, small cells may be selected.

In step S5, after selecting one or more sleep mode small cells, which may be in the vicinity of the fast moving UE, the serving macro cell may send a Delay Waking Up Indication message to the selected small cells. The Delay Waking Up Indication message may comprises information indicating that the one or more small cells in sleep mode should not wake up immediately although an active UE is detected in their coverage. The Delay Waking Up Indication may comprise information on the specific time of delay, i.e. the length of time of the delay. The delay may be determined in dependence on one or more of the estimated speed of the fast moving UE and the coverage of the small cell. The small cell may (re)start a Delay-waking-up timer every time the small cell receives a Delay Waking Up Indication message and may remain in sleep mode until the timer expires.

In step S6, on receiving the Delay Waking Up Indication from the macro cell, the small cell may send a Delay Waking Up Acknowledgement to the macro cell. Then, only if the measured IoT value at the small cell may exceed or equal the predetermined threshold for a relative long time, which is longer than the time specified in the Delay Waking Up Indication, the small cell may wake up. In this way the normal active UE and fast moving active UE may be distinguished by the small cell. A fast moving user may be a short time in the coverage area of a small cell during which the fast moving using is causing interference, but slow moving or stationary active UEs may cause quite stationary interference.

In step S7 after the fast moving UE moves out of the coverage of the small cell, the serving macro cell of the fast moving UE may send a Delay Waking Up Release message to the overlaying small cells which have received the Delay Waking Up Indication earlier.

In step S8, on receiving the Delay Waking Up Release from the macro cell, the small cell may send a Delay Waking Up Release Acknowledgement to the macro cell for response.

A further embodiment will now be described in relation to FIG. 7. The discovery signals transmitted by the small cell are to facilitate the discovery of the small cell by a UE. In this embodiment, for a small cell transmitting discovery signals on a same frequency used by the macro cell, the serving macro cell of the fast moving UE may send a Discovery Signal Muting Indication to the one or more small cells which are transmitting a discovery signal on the same frequency as the macro cell. Then the small cell may mute its discovery signal, for example for a time specified in the Discovery Signal Muting Indication. A Discovery-signal-muting (DS-muting) timer may be maintained at the small cell. The small cell may (re)start the Discovery-signal-muting (DS-muting) timer each time that small receives the Discovery Signal Muting Indication message and may mute the discovery signal until the timer expires.

The flow of FIG. 7 will now be described.

Steps 1 to 4 are the same or similar to those described in relation to FIG. 6. It should be appreciated that in step S4, the one or more cells selected will be one or more cells which transmit a discovery signal which may be on the same frequency as a frequency used by the macro cell, and/or which may be in the vicinity of the fast moving UE or likely to be in the vicinity of the fast moving UE. Alternatively all small cells overlaying, or at least partly overlaying the macro cell may be selected.

In step S5, after selecting one or more small cells which may be for example transmitting a discovery signal in the vicinity of the fast moving UE, the serving macro cell may send a Discovery Signal Muting Indication message to the selected one or more small cells. The Discovery Signal Muting Indication message may indicate that the one or more small cells which are transmitting a discovery signal may mute the discovery signal for a defined time or until an un-mute/release signal is received. The message may identify which one or more small cells are to mute their Discovery Signal. The Discovery Signal Muting Indication may comprise the specific length of time for which the discovery signal is to be muted. This may be determined in dependence on one or more of the estimated speed of the fast moving UE and the coverage area of the small cell. The small cell may (re)starts a Discovery-signal-muting (DS-muting) timer every time the small has received the Discovery Signal Muting Indication message and the discovery signal may be muted until the timer expires.

In step S6, on receiving the Discovery Signal Muting Indication from the macro cell, the small cell may send a Discovery Signal Muting Acknowledgement to the macro cell. The small cell may then mute the discovery signal for the time specified in the Discovery Signal Muting Indication. Since the fast moving UE will not be handed over to the nearby small cell, the discovery signal from the small cell is not required. If the discovery signal were to be sent, that signal may cause interference to the fast moving UE due to the fact that the discovery signal is transmitted on for example the frequency on which UE is operating. The interference may be relatively high when the fast moving UE passes through the centre of a small cell which is transmitting the discovery signal.

In step S7, the UE moves out of the vicinity or coverage area of the small cell.

In step S8, after the fast moving UE moves out of the coverage area or out of the vicinity of the small cell, the serving macro cell of the fast moving UE may send a Discovery Signal Muting Release message to the one or more overlaying small cells which have received the Discovery Signal Muting Indication earlier.

In step S9, on receiving the Discovery Signal Muting Release message from the macro cell, the small cell may send a Discovery Signal Muting Release Acknowledgement to the macro cell as a response.

Thus in some embodiments, the macro cell may indicate the required actions with respect to the fast moving user equipment to the overlying one or more small cells directly. One alternative may be for small cells which are in the sleep mode, and another alternative may be for the small cells which are transmitting discovery signals to facilitate small cell discovery for the UE.

In some embodiments, the serving macro cell of a fast moving UE may send related messages to the one or more small cell(s) in the vicinity of the fast moving UE or to all small cells overlaying, or at least part overlaying, the macro cell. These messages may directly indicate the action the small cell should take due to the fact that the UE approaching the small cell is a fast moving UE.

An apparatus provided in the base station of a macro cell is shown in FIG. 8 and an apparatus provide in the base station of a small cell is shown in FIG. 9. The blocks shown in FIGS. 8 and 9 represent function blocks. Each function block can be provided by software, hardware or a combination of the two. For example, each function block may comprise at least one memory and at least one processor. It should be appreciated that the same or part of the same at least one memory and/or at least one processor may provide one or more of the function blocks shown in FIG. 8.

A mobility state information function block 800 is arranged to either receive mobility state information from a user equipment or the base station of the macro cell may be otherwise aware of this information. If the mobility state information function block 800 determines or receives information that a user equipment is fast moving (e.g. if the user equipment exceeds or equals a defined threshold), this information may be provided to the small cell selection function block 802 and an indicator signal function block 804. The small cell selection function block 802 may be configured to determine or select one or more small cells in for example the vicinity of the fast moving user equipment, or all small cells overlaying, or at least partly overlaying the macro cell. This information may be provided to the indicator signal function block 804 and an indicator signal release function block 806. In response to the information received from the mobility state information function block and the small cell selection function block, the indicator signal functional block 804 may provide an appropriate signal to the transmitter 808. It should be appreciated that the indicator signal provided may take the form of any of the example signals described previously.

The user equipment location information function block 810 is arranged to determine when the fast moving user equipment may move out of the macro cell coverage area. The apparatus may receive this information from the user equipment itself or may make this determination itself or in conjunction with information received from the user equipment. This information may be provided to the indicator signal release function block 806. The indicator signal release function block 806 may cause the release signal to be provided to the transmitter 808 as previously discussed.

Reference is made to FIG. 9 which schematically shows some of the functional blocks of an apparatus of a small cell base station. The small cell may comprise a receiver 900. The output of the receiver 900 may be provided to a determining action in response to signal function block 902. This block may be responsive to the indicator signal or indicator signal release received from the base station of the macro cell. The action may be to provide a control signal to the discovery signal controller function block 904. This block may be configured to control whether or not the discovery signal may be transmitted. The determined action in response to signal function block may alternatively or additionally control a sleep mode timer function block 906. This sleep mode timer function block 906 will may control whether or not the base station is in a sleep mode or not. It should be appreciated that in some embodiments, the small cell base station may support only the option of suppressing the discovery signal or only the option of putting the base station into an energy-saving mode, such as a sleep mode.

In the above described embodiments, reference has been made to the use of timers. It should be appreciated that this is one mechanism by which the mode of the base station can be controlled and in other embodiments different methods may be used. It should be appreciated that timer may be a count up timer or a countdown timer. In general the usage of a sleep mode timer is optional.

In embodiments, reference this may be made to signals which control the muting of the discovery signal. Depending on the environment, it may of course be possible so that instead of muting the discovery signal, information is sent which causes the discovery signal to be sent. In the absence of this indication, the discovery signal is not sent.

In some embodiments, the control signals are instead used to put the cell into a wake-up mode and to release the small cell from the wake-up mode.

For example, in embodiments where there are often high speed user equipment, the default state may be for the discovery signal to be muted. The discovery signal may be transmitted on detection of for example one or more relatively slow or stationary user equipment.

A fast moving user equipment may be a user equipment which moves at the same speed or faster than a defined or calculated threshold. The threshold may be fixed or vary. Different thresholds may be used at different times and/or in different cells. A user equipment may for example be considered to be moving fast if the user equipment moves through a small cell in a time which shorter or the same order of the length of time taken to be handed over to the small cell Some embodiments may have one or more of the following advantages.

A small cell in a sleep mode may not switch to active mode when a fast moving user equipment approaches. This enables energy efficiency and interference reduction.

A small cell may mute a discovery signal for a period when a fast moving user equipment approaches. This may reduce the interference caused by the discovery signal to some extent.

Some embodiments do not put additional requirements on the existing UEs and can be backward compatible with legacy UEs.

The fast moving user equipment in the macro cell may cause uplink interference to one or more nearby small cells if the one or more small cells share the same carrier with the macro cell. One or more small cell may utilize the UE specific information comprised in Fast Moving User Indicator message for interference identification and mitigation.

Embodiments may be used with other releases of the LTE standard and/or with other standards.

A small or smaller cell may be a Pico cell, a femto cell, a HetNet cell or a smaller cell deployed in conjunction with a macro cell. A small cell is one which is smaller than a larger cell and the small cell at least partially overlays the larger cell. The larger cell may be a macro cell or any other cell which is larger than the small cell.

In some embodiments, an indicator message may be provided indicating fast moving users, delay waking up, or muting discovery signal transmission. Other messages can be omitted via for example one or more timers. A macro cell may make a decision as to whether to send an indicator message. Depending on the scenario, triggering conditions for the message could be one or more of just one fast moving UE, a specific number of fast moving UEs surrounding one or more cells, an amount of fast moving UEs with respect to the amount of slow moving UEs, and any other criteria.

It should be appreciated that some of the above embodiments may be modified such that small cells are woken up or put into a higher power mode when a slow moving or stationary user is detected but no action is taken in response to the detection of a fast moving user. For example, the small cells are woken up to serve the slow moving users and/or discovery signal transmission is switched on. This may be used in any suitable situation. For example, potentially slow users may be close to for example a highway.

Candidate small cells may be decided by the macro cell, based on load information, location information, neighbour cell measurements, and/or any other suitable criteria. For example, the macro cell may consider load balancing with respect to one or more small cells and let some fast moving UEs to access some small cells. Therefore overhead incurred is possibly limited.

Some embodiments may keep the signaling between macro base station and small base stations and avoid or reduce additional signaling towards a UE.

Some embodiments may use no release signal. Instead the function provided by the release signal may alternatively be provided by the expiry of a timer in the small base station. In this alternative, the indication signal may be sent periodically, if appropriate, in order to reset a timer.

The situation that the candidate small cells are close to e.g. a busy road or even a train station may be a special case that a lot of fast moving UEs are with a vehicle or other transportation means. The macro cell may control whether to indicate small cell to delay waking up via setting a specific triggering condition if the macro cell knows it is beside a road or train station. In other cases, especially in case of densely deployment of small cells, fast moving users may not appear so frequently in the scenarios. In other words, depending on the environment supported by the macro and small cells, different triggering conditions may be used.

To allow small cells to wake up for stationary users, the IoT threshold may be used as a or one controlling parameter for the respective timer. By an appropriate parameter value selection the sleep mode period may be controlled.

In some embodiments, there may be a direct interface between a small cell and the macro cell.

In some embodiments, instead of the messages being sent to the base station of the small cell from the base station of the large cell, the message or messages may be sent by any other suitable control apparatus associated with the large cell. By way of example the message may be sent by a controller such as a radio network controller.

Some embodiments have been described in the context of a sleep mode. It should be appreciated that the mode may be a dormant mode or any other energy-saving mode or lower power mode. When in such an energy saving mode, a small cell may turn off its reference signal (RS) and/or discovery signal and/or synchronization signal, or even turn off transmission of everything. In some embodiments, one or more component carriers for a small cell base station may be an energy saving mode, and the remaining one or more component carriers may still work. Thus the action taken with respect to a small cell when there is a fast moving UE, may only affect one or more of the component carriers of the cell. Thus some selected UEs may still be served.

The macro base station may decide, based on the number of fast moving UEs and/or the number of slow moving UEs detected, whether or not to send the indication to the small cell.

Some embodiments may be used in an environment where there may be a very dense deployment of small cells. This may mean that there are a relatively few number of UEs and there are a relatively high number of available small cells, so one small cell may possibly be in a lower power mode or be muted because of one fast moving UE, as a macro cell or small cell cluster controller/header may be aware of deployment scenarios and make the decision. Depending on the scenario, a triggering condition may be just one fast moving UE, or may be a specific number of fast moving UEs surrounding, or may be any other of scenario concerning fast moving UEs.

In one embodiment, the macro cell may send a "counter-indication" to the small cell in case, during the sleep period due to the fast moving UE, the macro eNB detects at least a slow moving UE in the area of the small cell. Similarly the macro cell may unmute a small cell or provide a counter indication to the small cell about the fast moving users. The counter indication may indicate that there is one or more slower or stationary UEs.

It is noted that whilst embodiments have been described in relation to LTE, similar principles may be applied to any other communication system or to further developments with LTE. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

What is claimed is:

1. A method comprising:
   receiving a control message by a base station of a first cell,
      wherein the control message is provided by a control apparatus of a second cell,
      wherein the first cell at least partially overlies the second cell,
      wherein the first cell is smaller than the second cell,
      wherein the control message is provided dependent on a mobility trigger condition of at least one user equipment prior to the at least one user equipment entering the first cell, and
      wherein the mobility trigger condition depends on velocity of the user equipment and criteria of the first cell; and
   causing, in response to the control message, the base station of the first cell to be in or switch to a first mode upon receipt of the control message,
      wherein the first mode comprises a sleep or dormant mode.

2. The method of claim 1 comprising:
   receiving a release message from said control apparatus at the base station of the first cell, and
   in response to the release message, permitting the base station of the first cell to be released from the first mode.

3. The method of claim 1, wherein the control message is configured to cause a timer in the base station of the first cell to be started.

4. The method of claim 3, comprising causing the base station of the first cell to be capable of entering a second mode in response to an expiry of the timer, wherein the second mode comprises an active mode.

5. The method of claim 1, wherein the base station of the first cell is configured to enter second mode only if another user equipment requires the base station of the first cell to be in the second mode, wherein the second mode comprises an active mode.

6. The method of claim 1, wherein the control apparatus comprises at least one of a base station and a network control element.

7. A method comprising:
   determining a user equipment to likely be approaching or entering the vicinity of a first cell by a control apparatus of a second cell prior to the user equipment entering the first cell; and
   causing a control message to be sent to a base station of the first cell,
      wherein the control message is caused to be sent by the control apparatus of the second cell,
      wherein the first cell at least partially overlies the second cell,
      wherein the control message is provided dependent on a mobility trigger condition of at least one user equipment and configured to cause the base station of the first cell to be in or switch to a first mode upon receipt of the control message,
      wherein the mobility trigger condition depends on velocity of the user equipment and criteria of the first cell, and
      wherein the first mode comprises a sleep or dormant mode.

8. The method of claim 7, comprising causing a release message to be sent from the control apparatus of the second cell to the base station of the first cell, the release message being configured to release the base station of the first cell from the respective first power and/or interference mode.

9. The method of claim 7, wherein the control apparatus is provided in a base station of a second cell.

10. A computer program product embodied on a non-transitory computer-readable medium in which a computer program is stored that, when being executed by a computer, is configured to provide instructions to control or carry out the method of claim 7.

11. An apparatus comprising: at least one processor and at least one memory including computer program code, wherein the at least one memory and the computer code are configured, with the at least one processor, to cause the apparatus to at least perform the following:
   receiving a control message, for a base station of a first cell, from a control apparatus of a second cell,
      wherein the first cell is at least partially overlying the second cell,
      wherein the first cell is smaller than the second cell,
      wherein the control message is provided dependent on a mobility trigger condition of at least one user equipment prior to the at least one user equipment entering the first cell, and
      wherein the mobility trigger condition depends on velocity of the user equipment and criteria of the first cell; and
   causing, in response to the control message, the base station of the first cell to be in or switch to a first mode upon receipt of the control message,
      wherein the first mode comprises a sleep or dormant mode.

12. The apparatus of claim 11, wherein the at least one memory and the computer code are further configured, with the at least one processor, to cause the apparatus to at least perform the following:
   receiving a release message from the control apparatus of the second cell; and
   in response to the release message, permitting the base station of the first cell to be released from the respective first mode.

13. The apparatus of claim 11, wherein the at least one memory and the computer code are further configured, with the at least one processor, to cause the apparatus to at least perform the following:
   starting a timer in the base station of the first cell, in response to the control message.

14. The apparatus of claim 13, wherein the at least one memory and the computer code are further configured, with the at least one processor, to cause the apparatus to at least perform the following:

causing the base station of the first cell to be capable of entering a second mode in response to an expiry of the timer, wherein the second mode comprises an active mode.

15. The apparatus of claim 11, wherein the at least one memory and the computer code are further configured, with the at least one processor, to cause the apparatus to at least perform the following:
causing the base station of the first cell to enter a second mode only in response to another user equipment requiring the base station of the first cell to be in the second mode, wherein the second mode comprises an active mode.

16. The apparatus of claim 11, wherein the control apparatus comprises at least one of a base station and a network control element.

17. A base station comprising an apparatus as claimed in claim 11.

18. An apparatus comprising: at least one processor and at least one memory including computer program code, wherein the at least one memory and the computer code are configured, with the at least one processor, to cause the apparatus to at least perform the following:
determining a user equipment to likely be approaching or entering the vicinity of a first cell prior to the user equipment entering the first cell; and
causing a control message to be sent to a base station of the first cell,
wherein the apparatus is associated with the second cell,
wherein the first cell at least partially overlies the second cell,
wherein the first cell is smaller than the second cell,
wherein the control message is provided dependent on a mobility trigger condition of at least one user equipment and configured to cause the base station of the first cell to be in or switch to a first mode upon receipt of the control message,
wherein the mobility trigger condition depends on velocity of the user equipment and criteria of the first cell, and
wherein the first mode comprises a sleep or dormant mode.

19. The apparatus of claim 18, wherein the at least one memory and the computer code are further configured, with the at least one processor, to cause the apparatus to at least perform the following:
causing a release message to be sent to the base station of the first cell, wherein the message is configured to release the base station of the first cell from the respective first mode.

20. The apparatus of claim 18, wherein the apparatus is provided in a second base station of a second cell.

* * * * *